(12) United States Patent
Kim et al.

(10) Patent No.: US 7,541,770 B2
(45) Date of Patent: Jun. 2, 2009

(54) BATTERY MODULE HAVING STRUCTURAL STRENGTH AND EFFICIENT COOLING

(75) Inventors: Tae-Yong Kim, Yongin-si (KR); Hong-Sup Lim, Yongin-si (KR); Yoon-Cheol Jeon, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 382 days.

(21) Appl. No.: 11/401,410

(22) Filed: Apr. 11, 2006

(65) Prior Publication Data

US 2006/0232135 A1 Oct. 19, 2006

(30) Foreign Application Priority Data

Apr. 14, 2005 (KR) .................. 10-2005-0030994

(51) Int. Cl.
*H01M 10/46* (2006.01)

(52) U.S. Cl. ...................................... 320/110

(58) Field of Classification Search ............... 320/107, 320/110, 114, 116, 150
See application file for complete search history.

(56) References Cited

U.S. PATENT DOCUMENTS 6,972,544 B2 * 12/2005 Seman et al. ............... 320/112

FOREIGN PATENT DOCUMENTS

| JP | 08-321329 | 12/1996 |
|---|---|---|
| JP | 2004-362879 | 12/2004 |

* cited by examiner

*Primary Examiner*—Edward Tso
(74) *Attorney, Agent, or Firm*—Robert E. Bushnell, Esq.

(57) ABSTRACT

A battery module includes a plurality of unit batteries disposed apart at intervals and a plurality of barriers interposed between the unit batteries. Each of the barriers includes a base supported on the unit battery and a plurality of protrusions extending from the base and contacting the unit battery. The protrusions are formed of an insulation material. In addition, the protrusions may be fixed onto the base in a staggered arrangement along columns and rows so that a certain angular arrangement between the alignment of protrusions is achieved, thereby maximizing cooling efficiency.

22 Claims, 14 Drawing Sheets

BATTERY MODULE HAVING STRUCTURAL STRENGTH AND EFFICIENT COOLING

CLAIM OF PRIORITY

This application makes reference to, incorporates the same herein, and claims all benefits accruing under 35 U.S.C. §119 from an application for SECONDARY BATTERY MODULE AND WALL OF SECONDARY BATTERY MODULE earlier filed in the Korean Intellectual Property Office on the 14$^{th}$ of Apr. 2005 and there duly assigned Ser. No. 10-2005-0030994.

BACKGROUND OF THE INVENTION

1. Technical Field

The present invention relates to a battery module and, more particularly, to a battery module having a plurality of unit batteries and interposed barriers.

2. Related Art

Unlike a primary battery, the rechargeable battery may be recharged. Lower power batteries are used for various portable electronic devices such as cellular phones, laptop computers, and camcorders. Bulk size batteries are used as the power source for motor drive, such as in hybrid electric vehicles.

Depending on the external shape, rechargeable batteries may be classified into different types, for example, prismatic and cylindrical batteries. When they are used for motor drives for machines requiring a high power source, such as the hybrid electric vehicles, the rechargeable batteries may form a battery module of high power.

The battery module is formed by serially connecting several rechargeable batteries (hereinafter "unit batteries"), and each of the unit batteries includes an electrode assembly in which a separator is interposed between a positive electrode and a negative electrode. The electrode assembly is inserted inside a case, and a cap assembly is assembled with the case to seal the case. The cap assembly can include terminals which are disposed so as to extend from the inside to the outside of the case, and which are electrically connected to the positive electrode and the negative electrode, respectively.

If the unit batteries are prismatic type batteries, the unit batteries are arranged so as to alternate positive and negative terminals of one unit battery projected from the upper portion of the cap assembly with the positive and negative terminals of an adjacent unit battery. Adaptors of the electric conductor are typically mounted on the threaded negative and positive terminals so that they are electrically connected with each other to form the battery module.

Since the battery module connects several to tens of unit batteries to form one battery module, there is a need to efficiently dissipate heat generated from each unit battery. In particular, when the unit batteries are used as bulk size rechargeable batteries for a motor drive, such as in electric vehicles, hybrid electric vehicles, motor scooters, and vacuum cleaners, heat dissipation is of significant importance.

If heat dissipation does not occur properly in the battery module, the temperature of the battery module may increase excessively due to the heat generated from each unit battery, and accordingly, not only the battery module but also the machines with the battery module can malfunction.

Accordingly, when forming the battery module, a barrier is disposed between unit batteries, and the space formed by the barriers between the unit batteries is used not only for cooling the unit batteries, but also for preventing distortion due to heat expansion of the unit batteries.

To perform such functions, the barrier needs sufficient strength, and structure for efficient heat dissipation.

However, the barriers in the conventional battery module do not satisfy the above two conditions simultaneously so that there is difficulty in forming battery modules of the quality which consumers expect.

That is, if the barriers provide sufficient strength, the manufacturing cost is increased and there is a restriction in designing a passage of cooling air. Alternatively, if the barriers are formed so as to have high cooling efficiency, they tend to exhibit structural weakness.

SUMMARY OF THE INVENTION

The present invention provides a battery module including a barrier which has sufficient strength for maintaining a unit battery shape, and which can efficiently control the unit battery temperature.

According to an embodiment of the present invention, a battery module comprises a plurality of unit batteries disposed apart at intervals, and a plurality of barriers interposed between the unit batteries, wherein each of the barriers includes a base supported on the unit battery and a plurality of protrusions extending from the base and contacting the unit battery, the protrusions being formed of an insulation material.

The base may be a plate or a bar.

Preferably, the protrusions are formed of ceramic or plastic, and/or are formed on only one surface of the plate.

The base may be formed of a conductive material. Alternatively, the base may be formed of an insulation material.

The protrusions may be separately formed and fixed on the base. In this case, the protrusions may be fixedly inserted in grooves formed on the base.

Alternatively, the base may be integrally formed with the protrusions.

Preferably, the protrusions have cross-sections which are circular, trapezoidal or rectangular in shape.

Preferably, the battery module is used as a power source for driving a motor.

Preferably, the protrusions are fixed on the base in a staggered arrangement along columns and rows. In this case, an angle between a first imaginary extending line, which connects a first protrusion disposed at an intersection point of a first column and a first row to a second protrusion disposed at an intersection point of a second column adjacent to the first column and a second row adjacent to the first row, and a second imaginary extending line, which connects the first protrusion to a third protrusion disposed at an intersection point of the second column and a third row adjacent to the first row at an opposite side of the second row, is preferably within a range of 30-150°. More preferably, the angle is within a range of 45-60°.

BRIEF DESCRIPTION OF THE DRAWINGS

A more complete appreciation of the present invention and many of the attendant advantages thereof will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention is described more fully hereinafter with reference to the accompanying drawings, in which exemplary embodiments of the present invention are shown.

Figure 1:
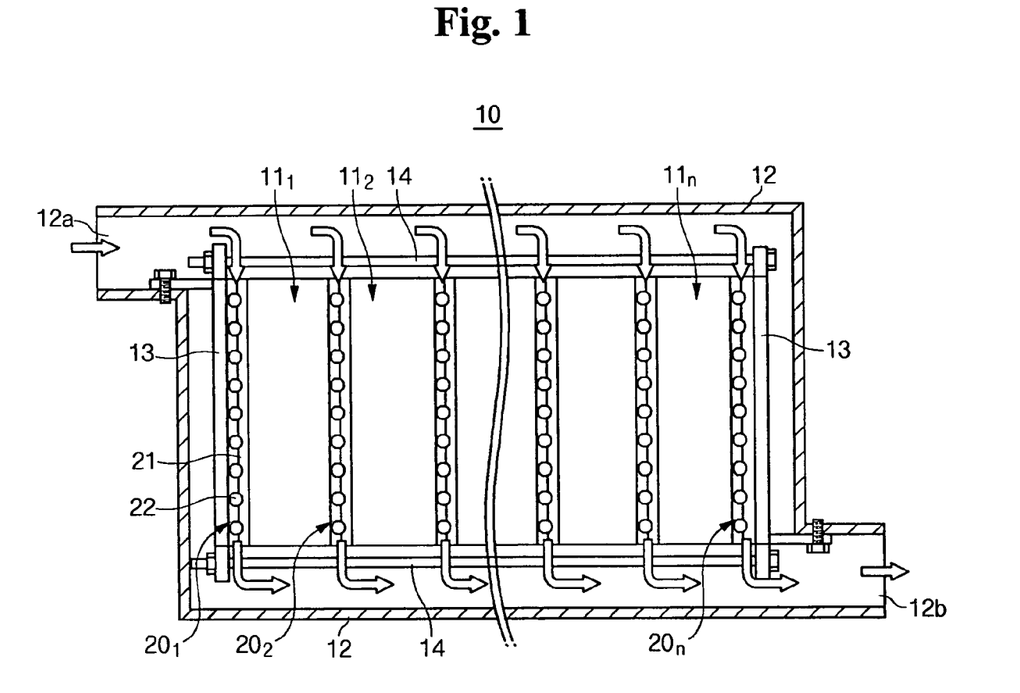
FIG. 1 is a cross-section side view of a battery module according to an embodiment of the present invention.

FIG. 1 is a cross-section side view of a battery module according to a first embodiment of the present invention.

Referring to FIG. 1, a battery module 10 according to the present embodiment includes a plurality of unit batteries $11_1$, $11_2$ ... $11_n$ spaced predetermined intervals apart from one another.

Each unit battery in the present embodiment is a prismatic type rechargeable battery which includes a case, an electrode assembly including a positive electrode, a negative electrode, and a separator to be inserted into the case, and a cap assembly installed on the case.

Barriers $20_1$, $20_2$ ... $20_n$ are disposed between the unit batteries $11_1$, $11_2$ ... $11_n$ so as to allow a coolant (e.g., air in the present embodiment) to flow between the unit batteries $11_1$, $11_2$ ... $11_n$. The barriers $20_1$, $20_2$ ... $20_n$ are attached to the unit batteries $11_1$, $11_2$ ... $11_n$ so as to support them.

Such unit batteries $11_1$, $11_2$ ... $11_n$ and the barriers $20_1$, $20_2$ ... $20_n$ can be attached by a fastener, that is, by end plates 13 disposed at both of the outermost sides of a unit battery aggregate comprised of the unit batteries $11_1$, $11_2$ ... $11_n$ and the barriers $20_1$, $20_2$ ... $20_n$, and by restraint rods 14 combined with the end plates 13 by a screw thread so as to fix the unit batteries $11_1$, $11_2$ ... $11_n$ and the barriers $20_1$, $20_2$ ... $20_n$ in place, thereby forming an assembly.

The assembly is mounted in a housing 12 having an inlet 12a for receiving air which cools the unit batteries $11_1$, $11_2$ ... $11_n$, and an outlet 12b for discharging the air.

The assembly is installed in the housing 12 by detachably fixing the end plates 13 to the housing 12 with fixing elements, for example, screws and/or nuts.

The inlet 12a is disposed on one side of the upper portion of the housing 12, and the outlet 12b is disposed on one side of the lower portion of the housing 12, the outlet 12b being arranged opposite to the inlet 12a. However, such a structure of the housing 12 is only one example of the structure which the present invention can adopt, and the present invention is not limited thereto.

Such a battery module 10 enables the incoming air entering the housing 12 through the inlet 12a of the housing 12 to flow from the upper portion to the lower portion of the housing 12, and to exit from the housing 12 through the outlet 12b of the housing 12.

During this process, the air passes through the barriers $20_1$, $20_2$ ... $20_n$, and the heat generated by the unit batteries $11_1$, $11_2$ ... $11_n$ is heat-exchanged by the air, thereby cooling the unit batteries $11_1$, $11_2$ ... $11_n$.

Figure 2:
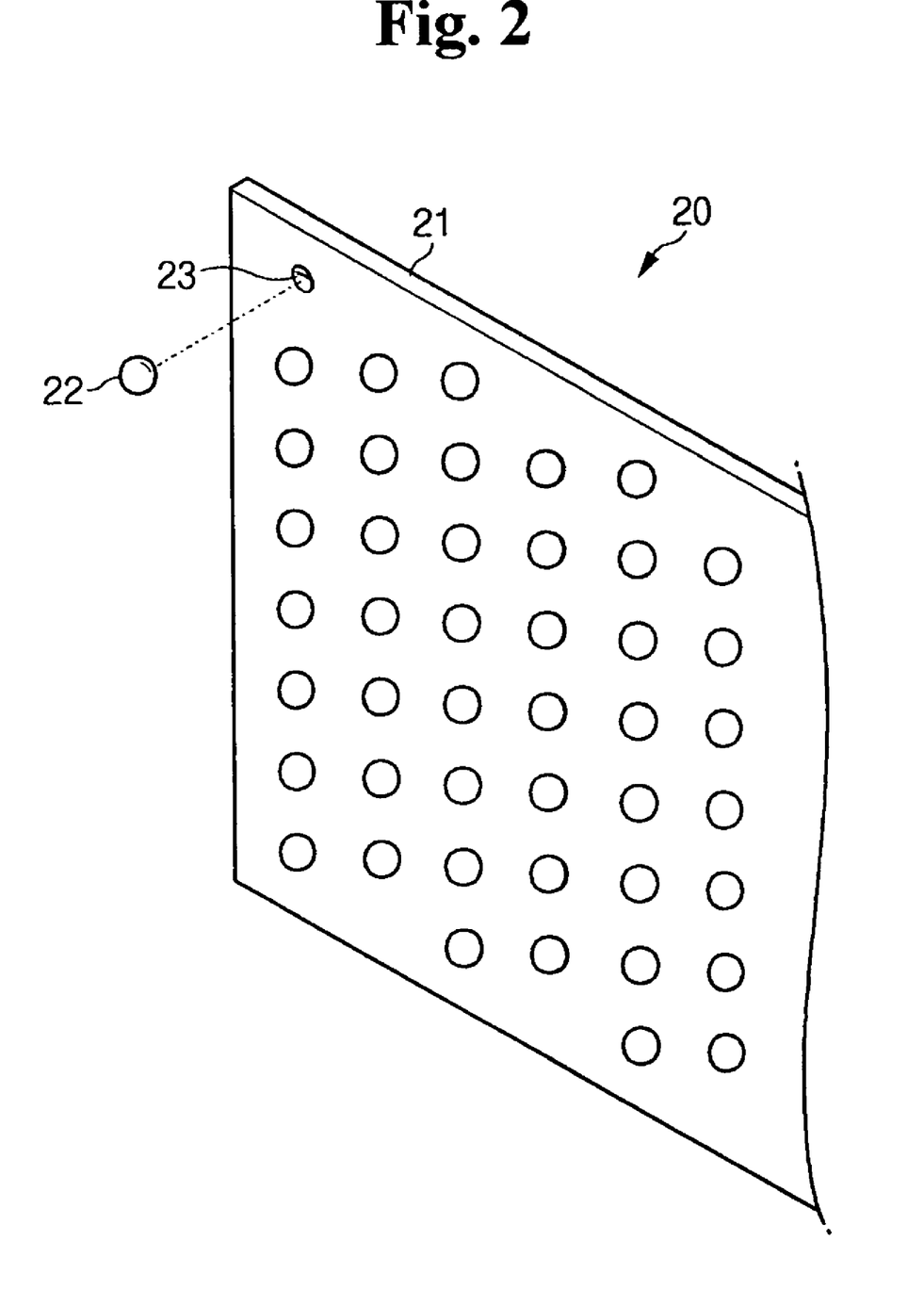
FIG. 2 is a perspective view of a barrier of the battery module of FIG. 1.
Figure 3:
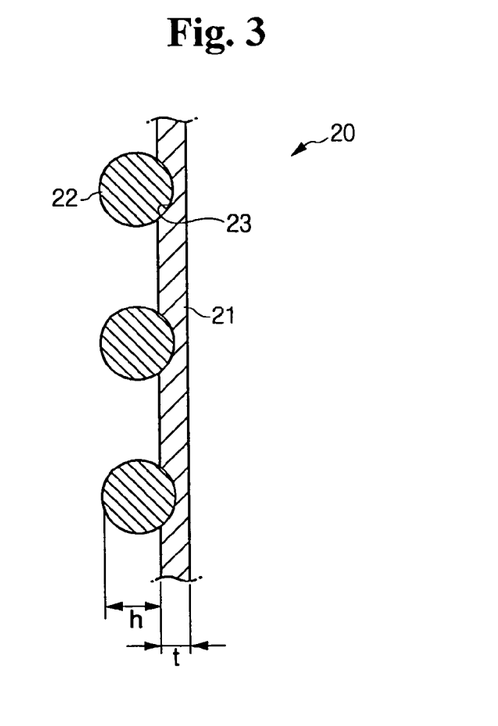
FIG. 3 is a cross-section view of the barrier of FIG. 2.

Referring to FIGS. 2 and 3, the barrier 20 is described in more detail. Since the barriers $20_1$, $20_2$ ... $20_n$ are identical in shape with respect to each other, only one barrier 20 will be described as an example.

The barrier 20 includes a base 21 and a plurality of protrusions 22 installed on the base 21.

In this embodiment, the base 21 is formed of a plastic material and has a surface area the same as a side surface of the unit battery 11. Each protrusion 22 is formed in a spherical shape. The protrusions 22 are attached to a surface of the base 21, and are spaced apart from each other by a predetermined distance. In addition, the protrusions 22 may be formed of an insulation material, such as ceramic.

In order to attach the protrusions 22 to the base 21, a plurality of grooves 23, each having a shape corresponding to that of the protrusion 22, are formed on the surface of the base 21, and the protrusions 22 are fixedly inserted in the grooves 23.

The fixing of the protrusions 22 in the grooves 23 may be achieved by inserting the protrusions 22 in the grooves 23 in an interference fit manner or by adhesive.

When the protrusions 22 are fixed in the grooves 23, a height h (FIG. 3) of the protrusion 22 directly affects a thickness t of the barrier 20, i.e., an interval between the unit batteries 11. Thus, the height h of the protrusion 22 may be properly adjusted according to the design of the battery module.

Referring back to FIG. 1, when the battery module 10 is formed by disposing the barriers $20_1$, $20_2$ ... $20_n$ between the unit batteries $11_1$, $11_2$ ... $11_n$, first surfaces of the bases 21 closely contact first side surfaces of the unit batteries $11_1$, $11_2$ ... $11_n$ while protrusions 22 protruding from second surfaces of the bases 21 closely contact second side surfaces of the unit batteries $11_1$, $11_2$ ... $11_n$ so as to uniformly maintain intervals between the unit batteries $11_1$, $11_2$ ... $11_n$.

Therefore, predetermined intervals are maintained between the unit batteries $11_1$, $11_2$ ... $11_n$, between the end plate 13 and the unit battery 11, and between the end plate 13 and the unit battery 11n. Thus, the incoming air entering the housing 12 passes through spaces defined between the protrusions 22 to dissipate the heat generated by the unit batteries $11_1$, $11_2$ ... $11_n$.

Since the protrusions 22 of the barriers $20_1$, $20_2$ ... $20_n$ and the base 21 closely contact the unit batteries $11_1$, $11_2$ ... $11_n$, they can function to support the unit batteries $11_1$, $11_2$ ... $11_n$ against an expanding force which would otherwise deform the unit batteries $11_1$, $11_2$ ... $11_n$ when the battery module is being used.

At this point, the protrusions 22 are uniformly distributed on the supporting portions of the unit batteries $11_1$, $11_2$ ... $11_n$ so as to support the unit batteries $11_1$, $11_2$ ... $11_n$, and the supporting force applied to the unit batteries $11_1$, $11_2$ ... $11_n$ is enhanced, thereby preventing the unit batteries $11_1$, $11_2$ ... $11_n$ and the barriers $20_1$, $20_2$ ... $20_n$ from being deformed.

Furthermore, since the protrusions 22 are formed of insulation material, such as ceramic, there is no need to dispose separate insulation members for preventing a short circuit between the unit batteries $11_1$, $11_2$ ... $11_n$.

If required, the bases 21 of the barriers $20_1$, $20_2$ ... $20_n$ may also be formed of an insulation material, such as ceramic.

Figure 4:
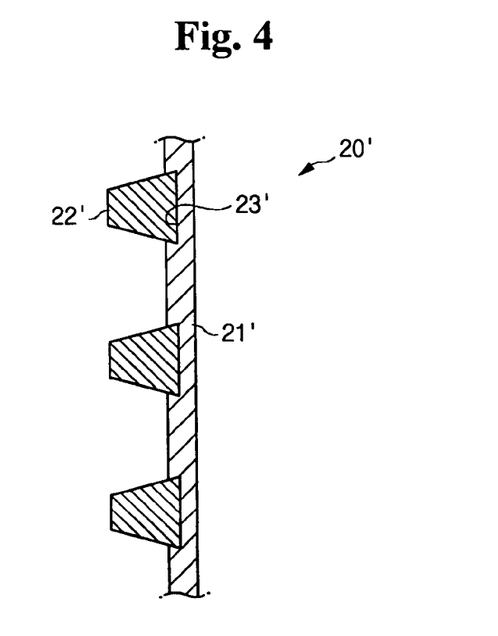
FIGS. 4 thru 6, 7A thru 7D, 8A thru 8D, and 9A thru 9H are views of a variety of modified examples of the barrier of FIG. 2.
Figure 5:
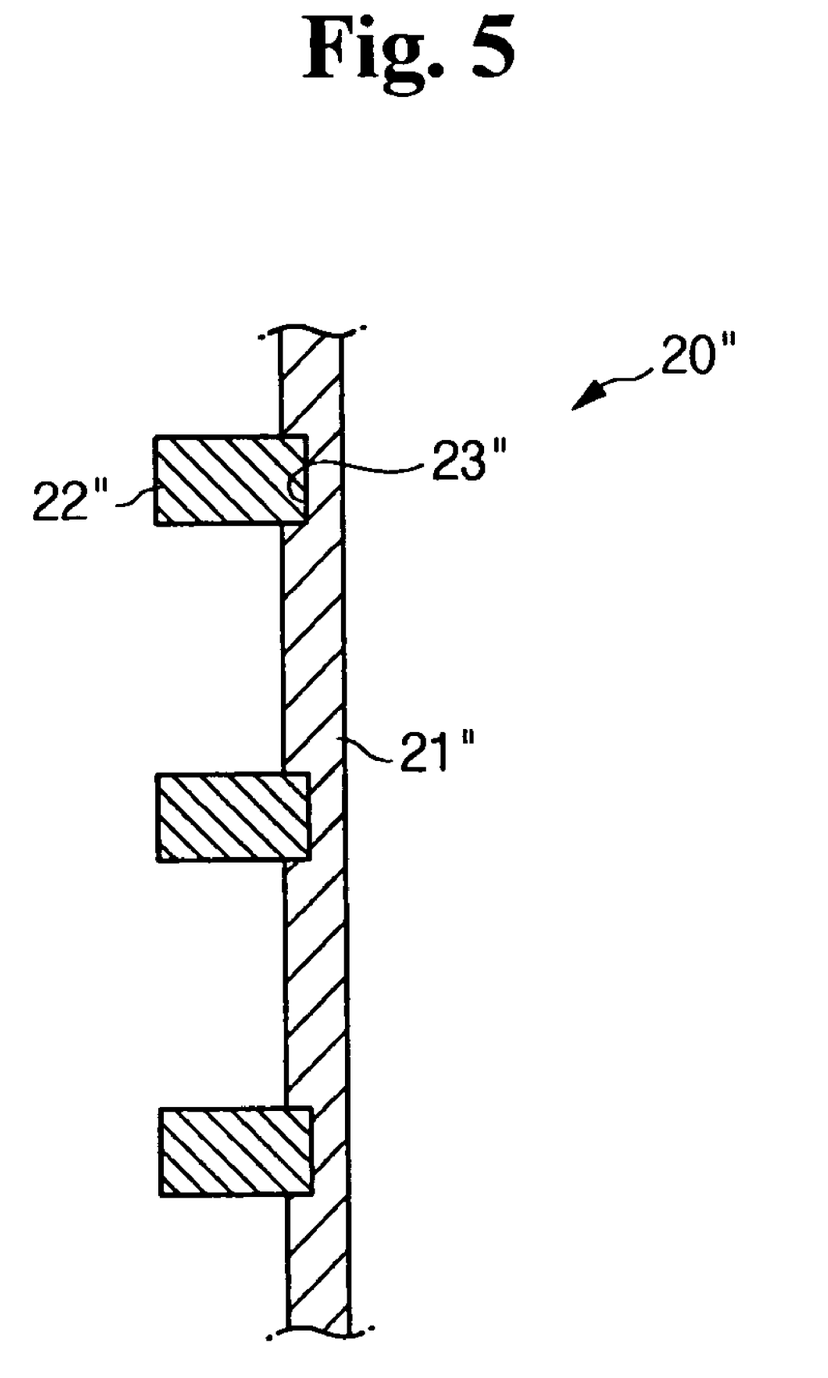

FIGS. 4 and 5 are cross-section views of modified examples of the barrier.

FIG. 4 shows a case wherein a barrier 20' includes a base 21' and a plurality of protrusions 22', each protrusion 22' having a trapezoidal cross-section. The protrusions 22' are fixedly inserted in grooves 23' formed on the base 21'.

The protrusions may be formed in a variety of other shapes in addition to the above shape.

FIG. 5 shows a case wherein a barrier 20" includes a base 21" and a plurality of protrusions 22", each protrusions 22" having a rectangular cross-section. The protrusions 22" are fixedly inserted in grooves 23" formed on the base 21".

Figure 6:
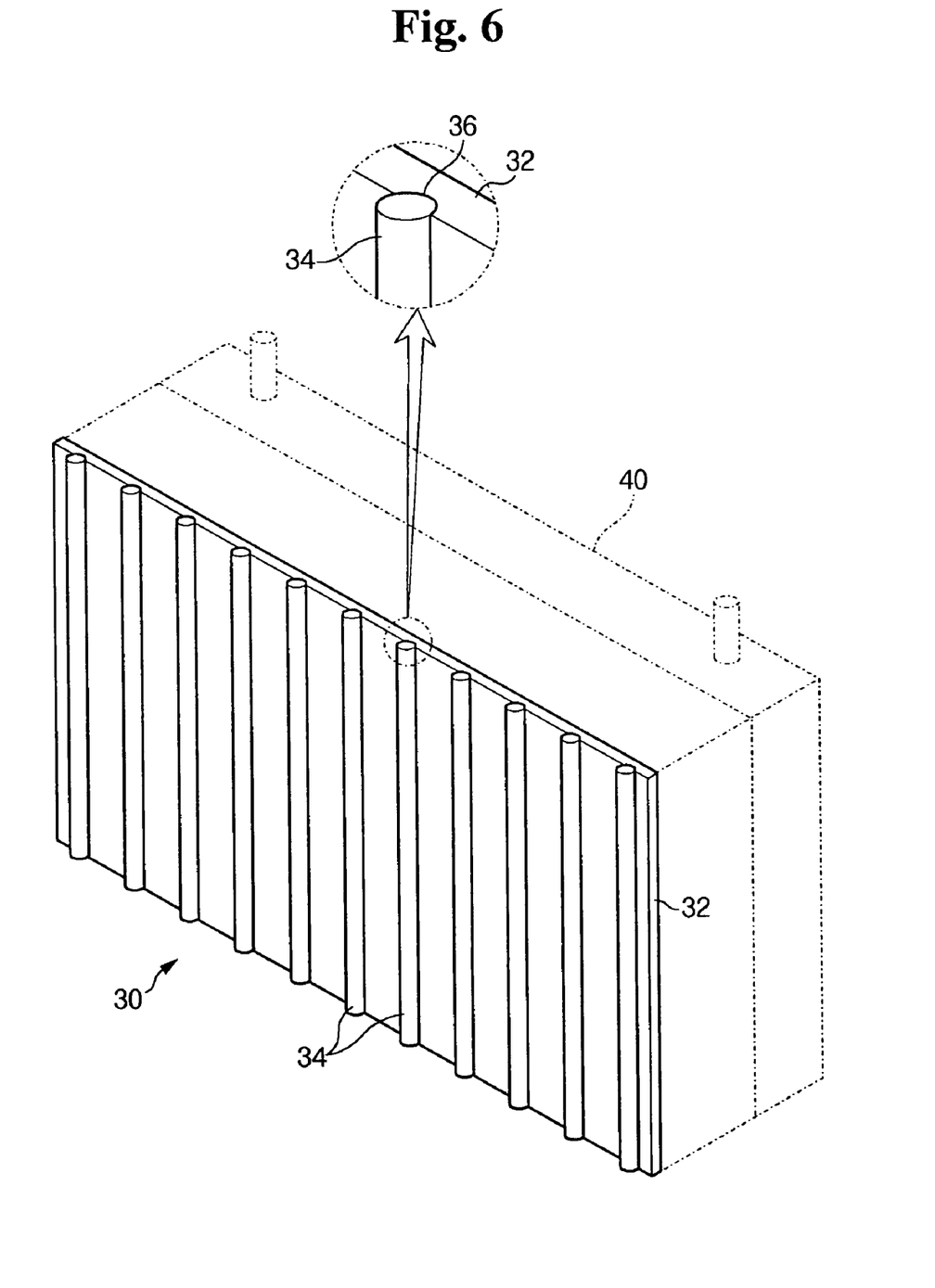
Figure 7A:
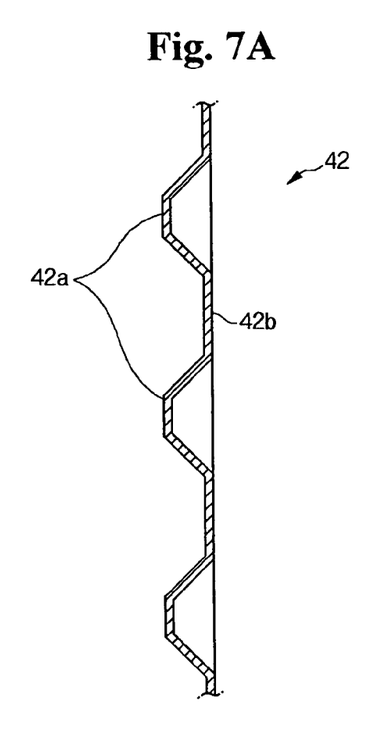
Figure 7B:
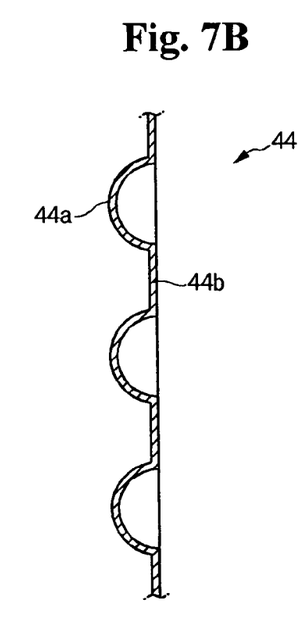
Figure 7C:
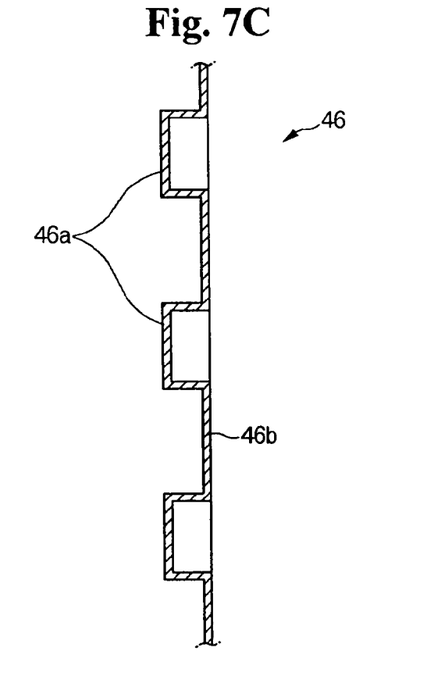
Figure 7D:
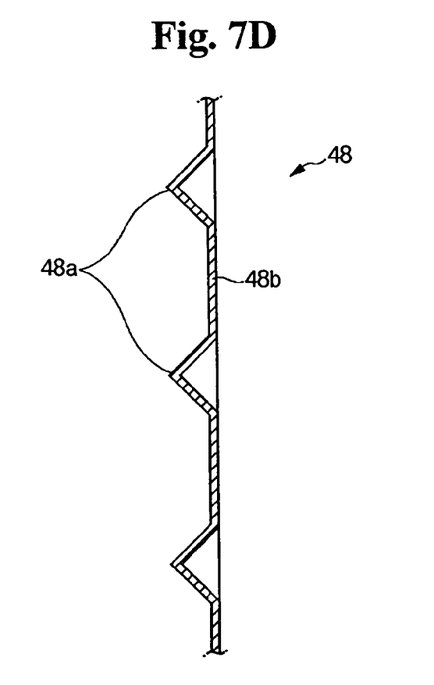
Figure 8A:
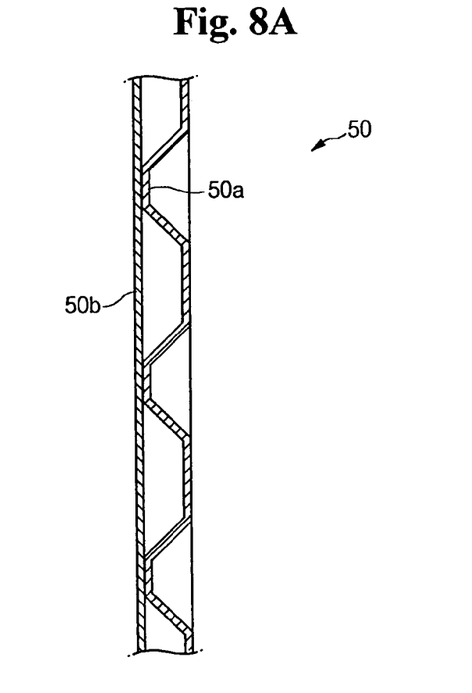
Figure 8B:
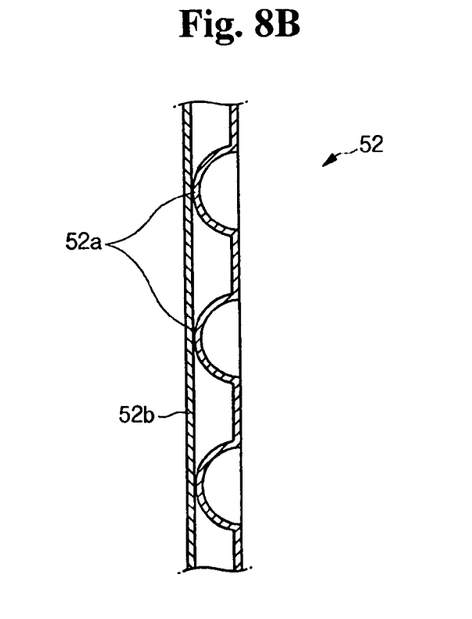
Figure 8C:
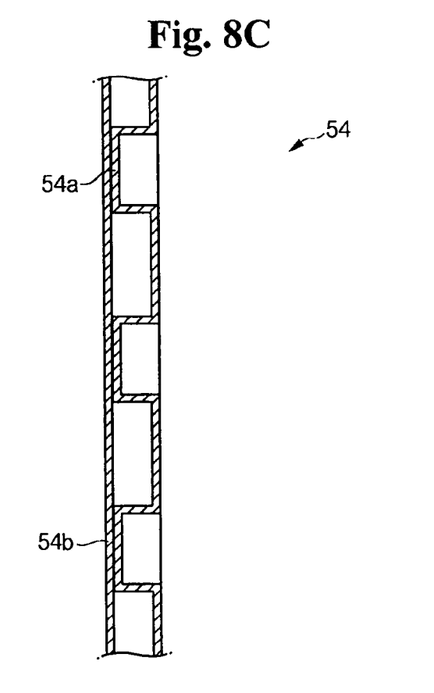
Figure 8D:
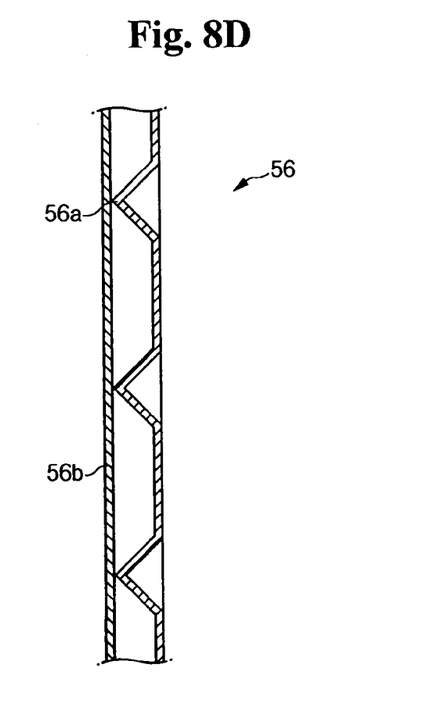
Figure 9A:
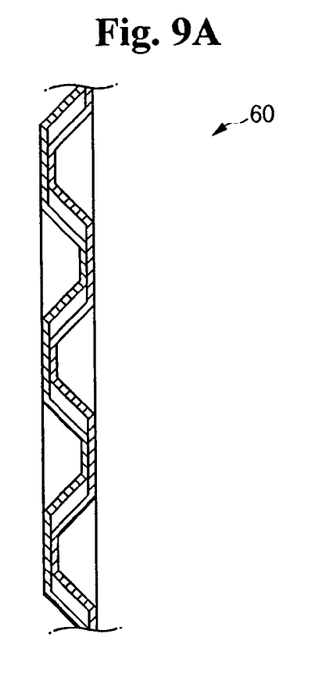
Figure 9B:
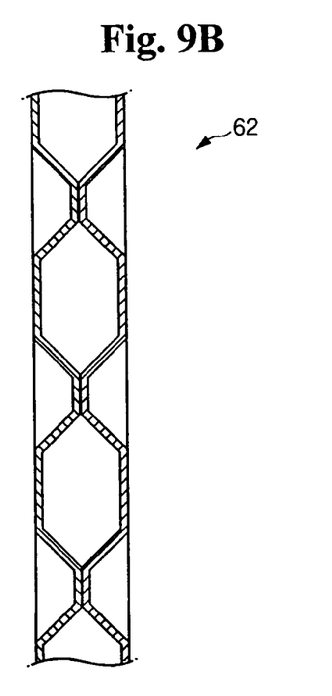
Figure 9C:
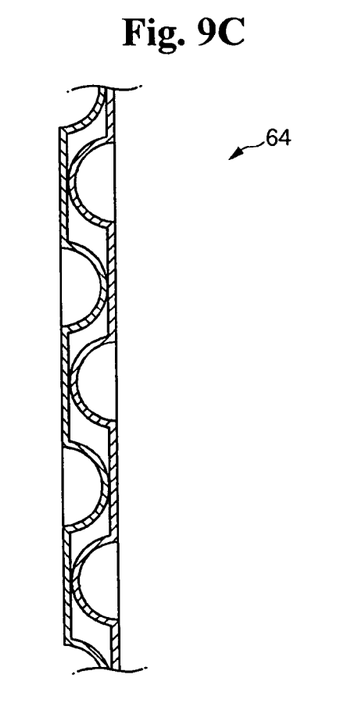
Figure 9D:
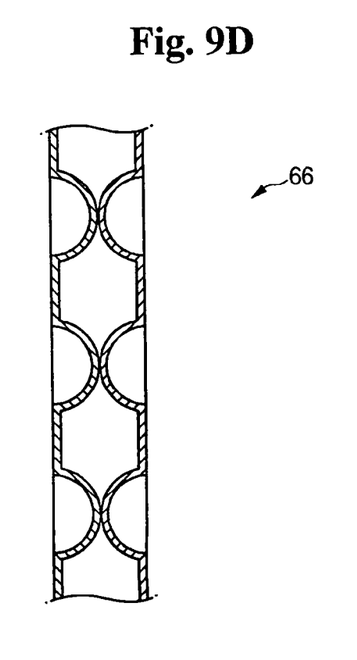
Figure 9E:
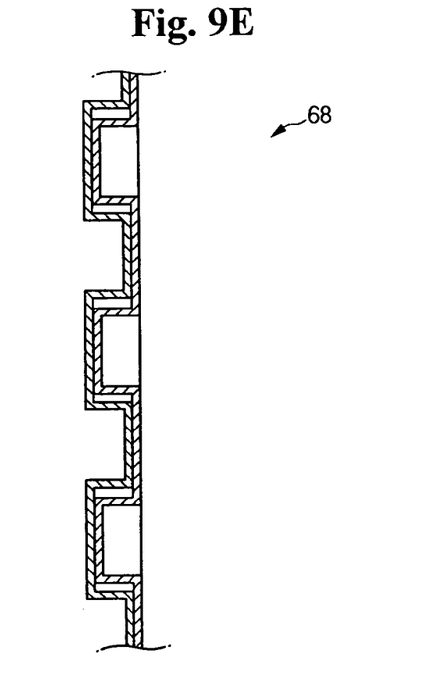
Figure 9F:
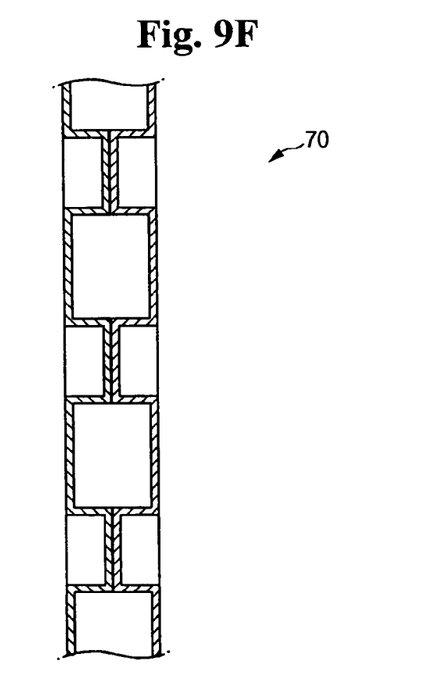
Figure 9G:
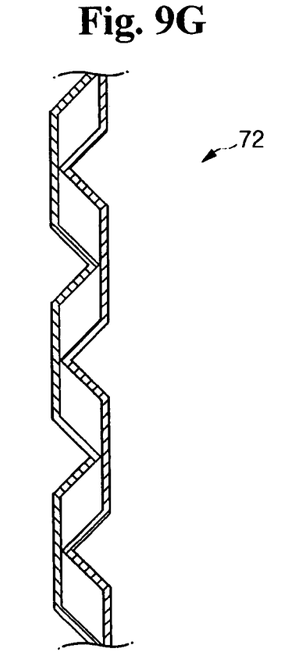
Figure 9H:
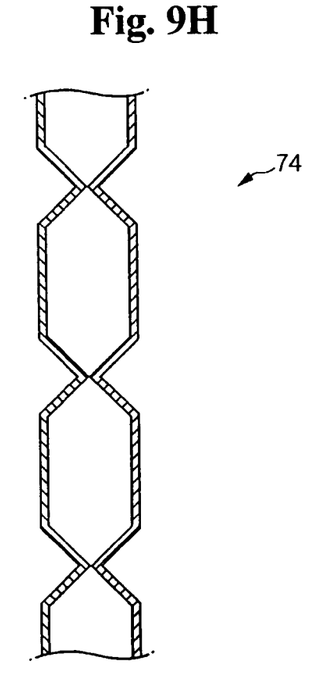

FIG. 6 is an exploded perspective view of another modified example of the barrier.

In this modified example, the barrier 30 includes a base 32 formed of metal, such as aluminum or cooper, having a high thermal conductivity, and a plurality of bars 34 are attached to protrude from a surface of the base 32. The bars 34 are spaced apart from each other by a predetermined distance. The bars 34 have circular cross-sections. The bars 34 may be formed of an insulation material, such as ceramic.

In order to attach the bars 34 to the base 32, a plurality of grooves 36, each having a shape corresponding to that of the bar 34, are formed on the surface of the base 32, and the bars 34 are fixedly inserted in the grooves 36.

The fixing of the bars 34 in the grooves 36 may be achieved by inserting the bars 34 in the grooves 36 in an interference fit manner or by adhesive.

The cross-sections of the bars may be formed in a variety of shapes, such as a trapezoidal shape, a rectangular shape or an oval shape, in addition to the circular shape. In this case, the grooves are formed to correspond to the shape of the bars.

Since the function of the barriers 30 of this embodiment is identical to that of the barrier of the foregoing embodiments, a detailed description thereof will be omitted herein.

FIGS. 7A thru 7D are cross-section views of other modified examples of the barrier.

Referring to FIGS. 7A thru 7D, barriers 42, 44, 46 and 48 have protrusions 42a, 44a, 46a and 48a, respectively, and bases 42b, 44b, 46b and 48b, respectively. The protrusions 42a, 44a, 46a and 48a are integrally formed with the bases 42b, 44b, 46b and 48b, respectively. The bases and the protrusions are formed of an insulation material, such as ceramic or plastic. z The protrusions 42a, 44a, 46a, and 48a may be hollow as shown in the drawings or they may be solid.

FIGS. 8A thru 8D are cross-section views of other modified examples of the barrier.

Referring to FIGS. 8A thru 8D, additional plates 50b, 52b, 54b and 56b are attached to front ends of protrusions 50a, 52a, 54a, and 56a, respectively, of barriers 50, 52, 54, and 56, respectively, which are identical to those depicted in FIGS. 7A thru 7D.

In this embodiment, since the plates 50b, 52b, 54b, and 56b, instead of the protrusions, contact the side surfaces of the unit batteries, the areas of contact with the unit batteries increase, thereby further enhancing the supporting force against the unit batteries. The plates 50b, 52b, 54b, and 56b are preferably formed of the same material as the protrusions.

FIGS. 9A thru 9H are cross-section views of other modified example of the barrier.

Referring to FIGS. 9A thru 9H, barriers 60, 62, 64, 66, 68, 70, 72, and 74 are formed by combining two barriers of the foregoing embodiments to increase the strength thereof.

When arranging the protrusions on the base, the protrusions are arranged to satisfy the following conditions. This will be described with reference to the barrier of FIG. 10.

Figure 10:
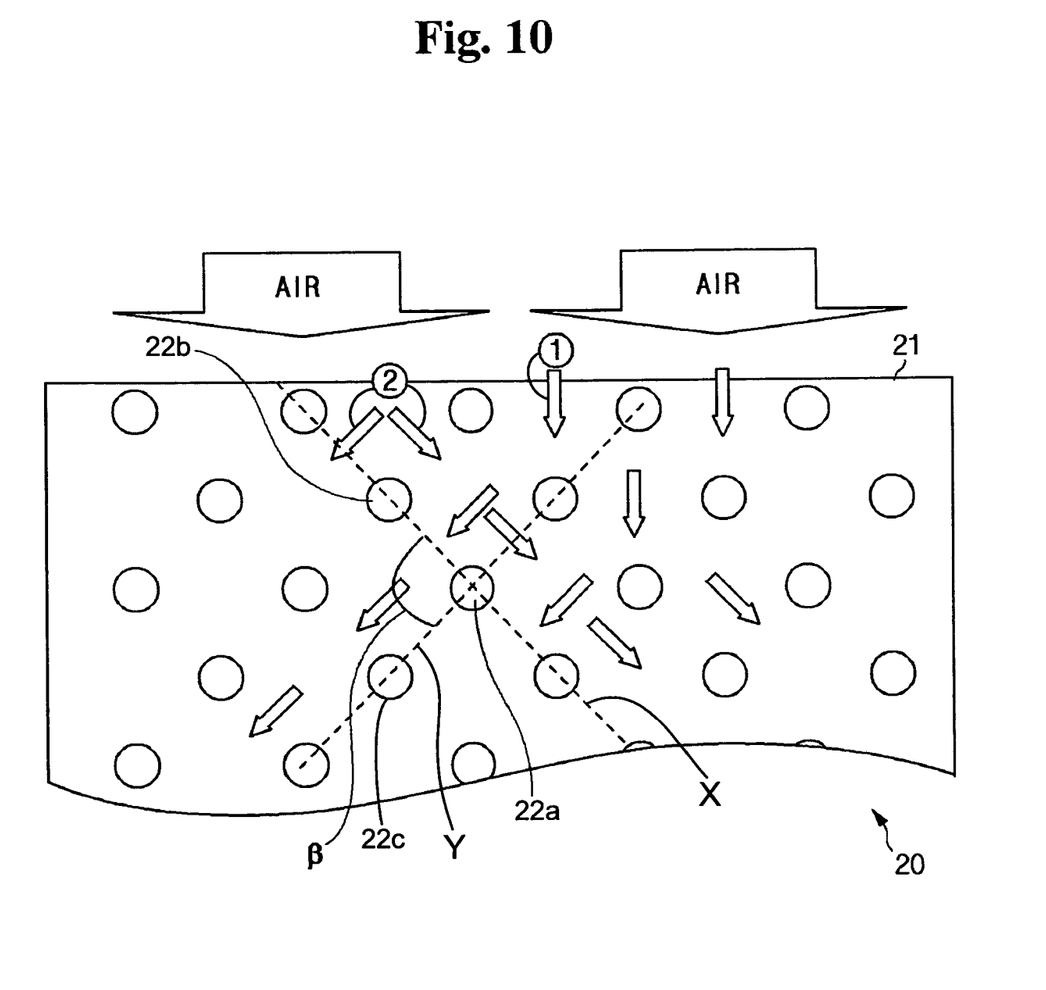
FIG. 10 is a view illustrating the operation of the barrier depicted in FIG. 2.

Referring to FIG. 10, the protrusions 22 are fixed on the base 21 in a staggered arrangement along columns and rows. At this point, an angle β between a first imaginary line X, which connects a first protrusion 22a disposed at an intersection point of a first column and a first row to a second protrusion 22b disposed at an intersection point of a second column adjacent to the first column and a second row adjacent to the first row, and a second imaginary line Y, which connects the first protrusion 22a to a third protrusion 22c disposed at an intersection point of the second column and a third row adjacent to the first row at an opposite side of the first row relative to the second row, is preferably set to satisfy the following condition:

$$30° \leq \beta \leq 150°$$

More preferably, the angle β is set to satisfy the following condition:

$$45° \leq \beta \leq 60°$$

With the above-described arrangement of the protrusions 22a, 22b and 22c, the air flowing into the barrier 20 through the inlet 12a of the housing 12 of FIG. 1 collides with the protrusions 22a, 22b and 22c of FIG. 10, and is dispersed toward both sides of the protrusions 22a, 22b and 22c (see arrows ① and ② of FIG. 10).

That is, the air collides with the protrusions 22a, 22b and 22c, and changes its direction of flow toward both sides of the protrusions 22a, 22b and 22c. At this point, the speed of air flow would normally be a factor affecting the cooling efficiency of the unit battery.

That is, when the air passing through the barrier 20 cannot flow at a proper speed, the pressure drop in the barrier 20 would normally increase, and thus the air flow resistance in the housing 12 would normally increase. This would result in deterioration of the cooling efficiency for the unit battery. Furthermore, when the air cannot properly disperse in the barrier 20, heat exchange cannot be effectively realized, and thus the cooling efficiency for the unit battery would normally deteriorate. Furthermore, when a unit, such as a cooling fan, is more strongly operated to increase the speed of flow of the air, the unit may be overloaded which would normally cause a variety of other problems.

However, to avoid and solve these problems, in the present invention, the angle β is set within the above-described range so that the air flows at the proper speed, and thus the cooling efficiency for the unit battery is maximized.

It has been observed through testing that, when the angle β is less than 30°, the heat exchange efficiency is too low, and when the angle β is greater than 150°, the air flow speed is too low. However, when the angle β is set to within 30° to 150°, and preferably to within 45° to 60°, these problems are avoided, and cooling efficiency is maximized.

According to the present invention, since the barriers are improved in their structures and are formed of the insulation material, short circuit between the unit batteries can be prevented. Furthermore, there is no need to provide separate insulation members, and thus the manufacturing cost of the battery module can be reduced.

Moreover, since the structure of the barrier and the air flow structure of the barrier are improved, a sufficient strength of the barrier can be achieved, thereby preventing the deformation of the barrier and improving the heat-exchange efficiency.

In addition, since the direction of flow of the air passing through the barrier can be freely designed, the design range of the battery module can be expanded.

The battery module can be used for motor drive of equipment requiring high power characteristics such as HEVs (Hybrid Electric Vehicles), EVs (Electric Vehicles), cordless vacuum cleaners, motorbikes, electric scooters, and so on.

It should also be noted that the base of the barrier may be provided in the form of a plate, or in the form of a bar integrally formed with or assembled with the protrusions.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A battery module, comprising:
a plurality of unit batteries disposed apart at intervals; and
a plurality of barriers interposed between the unit batteries;
wherein each of the barriers includes a base supported on the unit battery and a plurality of protrusions extending from the base and contacting the unit battery, the protrusions being formed of an insulation material; and
wherein the base is formed of a conductive material.

2. The battery module of claim 1, wherein the base is a plate.

3. The battery module of claim 2, wherein the protrusions are formed on only one surface of the plate.

4. The battery module of claim 1, wherein the base is a bar.

5. The battery module of claim 1, wherein the protrusions are formed of one of ceramic and plastic.

6. The battery module of claim 1, wherein the base is formed of an insulation material.

7. The battery module of claim 1, wherein the protrusions are separately formed and fixed on the base.

8. The battery module of claim 7, wherein the protrusions are fixedly inserted in grooves formed on the base.

9. The battery module of claim 1, wherein the base is integrally formed with the protrusions.

10. The battery module of claim 1, wherein each of the protrusions has a cross-section which is one of circular, trapezoidal and rectangular in shape.

11. The battery module of claim 1, wherein the battery module is used as a power source for driving a motor.

12. The battery module of claim 1, wherein, when the protrusions are fixed on the base in a staggered arrangement along columns and rows, an angle between a first imaginary line, which connects a first protrusion disposed at an intersection point of a first column and a first row to a second protrusion disposed at an intersection point of a second column adjacent to the first column and a second row adjacent to the first row, and a second imaginary line, which connects the first protrusion to a third protrusion disposed at an intersection point of the second column and a third row adjacent to the first row at an opposite side of the first row adjacent to the second row, is within a range of 30-150°.

13. The battery module of claim 12, wherein the angle is within a range of 45-60°.

14. A battery module, comprising:
a plurality of unit batteries disposed apart at intervals; and
a plurality of barriers interposed between the unit batteries;
wherein each of the barriers includes a base supported on the unit battery and a plurality of protrusions extending from the base and contacting the unit battery, the protrusions being formed of an insulation material; and
wherein the protrusions are fixedly inserted in grooves formed on the base.

15. The battery module of claim 14, wherein the base is formed of a conductive material.

16. The battery module of claim 14, wherein the protrusions are fixed on the base in a staggered arrangement along columns and rows.

17. The battery module of claim 16, wherein an angle between a first imaginary line, which connects a first protrusion disposed at an intersection point of a first column and a first row to a second protrusion disposed at an intersection point of a second column adjacent to the first column and a second row adjacent to the first row, and a second imaginary line, which connects the first protrusion to a third protrusion disposed at an intersection point of the second column and a third row adjacent to the first row at an opposite side of the first row adjacent to the second row, is within a range of 30-150°.

18. The battery module of claim 17, wherein the angle is within a range of 45-60°.

19. A battery module, comprising:
a plurality of unit batteries disposed apart at intervals; and
a plurality of barriers interposed between the unit batteries;
wherein each of the barriers includes a base supported on the unit battery and a plurality of protrusions extending from the base and contacting the unit battery, the protrusions being formed of an insulation material; and
wherein the protrusions are fixed on the base in a staggered arrangement along columns and rows.

20. The battery module of claim 19, wherein an angle between a first imaginary line, which connects a first protrusion disposed at an intersection point of a first column and a first row to a second protrusion disposed at an intersection point of a second column adjacent to the first column and a second row adjacent to the first row, and a second imaginary line, which connects the first protrusion to a third protrusion disposed at an intersection point of the second column and a third row adjacent to the first row at an opposite side of the first row adjacent to the second row, is within a range of 30-150°.

21. The battery module of claim 20, wherein the angle is within a range of 45-60°.

22. The battery module of claim 19, wherein the base is formed of a conductive material.

* * * * *